US006596170B2

(12) United States Patent
Tuszko et al.

(10) Patent No.: US 6,596,170 B2
(45) Date of Patent: Jul. 22, 2003

(54) LONG FREE VORTEX CYLINDRICAL TELESCOPIC SEPARATION CHAMBER CYCLONE APPARATUS

(76) Inventors: Wlodzimierz Jon Tuszko, 5434 Camino De Ville, Camarillo, CA (US) 93012; Wojciech Tuszko, 918 4th St., Apt. 2, Santa Monica, CA (US) 90403

( * ) Notice: Subject to any disclaimer, the term of this patent is extended or adjusted under 35 U.S.C. 154(b) by 0 days.

(21) Appl. No.: 10/131,425

(22) Filed: May 22, 2002

(65) Prior Publication Data

US 2002/0148777 A1 Oct. 17, 2002

Related U.S. Application Data

(63) Continuation-in-part of application No. 09/721,780, filed on Nov. 24, 2000, now abandoned.

(51) Int. Cl.[7] ........................ B01D 21/26; B01D 17/038

(52) U.S. Cl. .................... 210/512.1; 209/715; 209/727; 55/459.1

(58) Field of Search .............................. 210/512.1, 788; 209/715, 727; 95/271; 55/459.1

(56) References Cited

U.S. PATENT DOCUMENTS

| | | | |
|---|---|---|---|
| 4,927,298 | A | 5/1990 | Tuszko et al. |
| 5,071,542 | A | 12/1991 | Tuszko et al. |
| 5,269,949 | A | 12/1993 | Tuszko et al. |
| 5,273,647 | A | 12/1993 | Tuszko et al. |
| 5,453,196 | A | 9/1995 | Tuszko et al. |
| 6,071,424 | A | 6/2000 | Tuszko et al. |

*Primary Examiner*—David A. Reifsnyder

(57) ABSTRACT

The long free vortex cylindrical telescopic cyclone features of the decreased pressure drop, increased both capacity and separation efficiency, as well as of ability to be adjusted to the solids particles distribution of the feed processed.

3 Claims, 4 Drawing Sheets

A-B

LONG FREE VORTEX CYLINDRICAL TELESCOPIC SEPARATION CHAMBER CYCLONE APPARATUS

This Application is a Continuation-In-Part of application Ser. No. 09/721,780, filed on Nov. 24, 2000, now abandoned.

FIELD OF INVENTION

This invention relates to a apparatus for continuous separation of solid-solid, solid-fluid suspension of particulate material. More specifically, the invention is directed to considerably increasing capacity and separation efficiency as well as to reduce pressure drop compared to the conventional conical cyclone separator.

BACKGROUND

An-early hydrocyclone method and apparatus from U.S. Pat. No. 453,105 (Bretney) issued May 28, 1891 in which there are two stages, in line, in the separating hydrocyclone. A frequent problem with this and later hydrocyclone devices are--so called "back mix," high pressure drop and fast erosion of the conical portion.

A hydrocyclone is a device for creation of a free vortex, and it is the vortex that does the work in separating the particle matter from liquid.

The new features of the hydrocyclone air core as the vortex driving force, was discovered and used to greatly improve the hydrocyclone collectors. Wlodzimierz J. Tuszko and all U.S. Pat. No. 4,927,298 issued May 22, 1990. U.S. Pat. No. 5,269,949 issued Dec. 14, 1993, U.S. Pat. No. 5,273,647 issued Dec. 28, 1993, application Ser. No. 08/238,903 filing date May 6, 1994 now abandoned. application Ser. No. 08/402,175 filing date Mar. 10, 1955 now abandoned. U.S. Pat. No. 6,071,424 issued Jun. 6, 2000.

It is therefore the object of the present invention to greatly decrease pressure drop and increase both capacity and separation efficiency performances compared to conventional conical cyclone.

Further object of the current invention is to prevent the patented method, U.S. Pat. No. 6,071,424 issued Jun. 6, 2000, from infringement with smaller amount of claim elements compared to the patented method.

SUMMARY OF THE INVENTION

This invention relates to a device for separating of particulate fluid suspension known as a cyclone separator, in which centrifugal forces of the revolving particulate suspension cause separation of the suspension into finer and coarser or light and denser fractions. The conventional of the conical predominating shape, cyclone features of both high pressure drop and energy consumption to get a low separation efficiency for low capacity. This conical cyclone portion participates in creating so-called "back mix" is vulnerable to be fast eroded.

To avoid those harmful phenomenons the present invention provides long free vortex cyclone with cylindrical telescopic separation chamber with air core or without it.

DETAILED DESCRIPTION OF THE INVENTION

Figure 1:
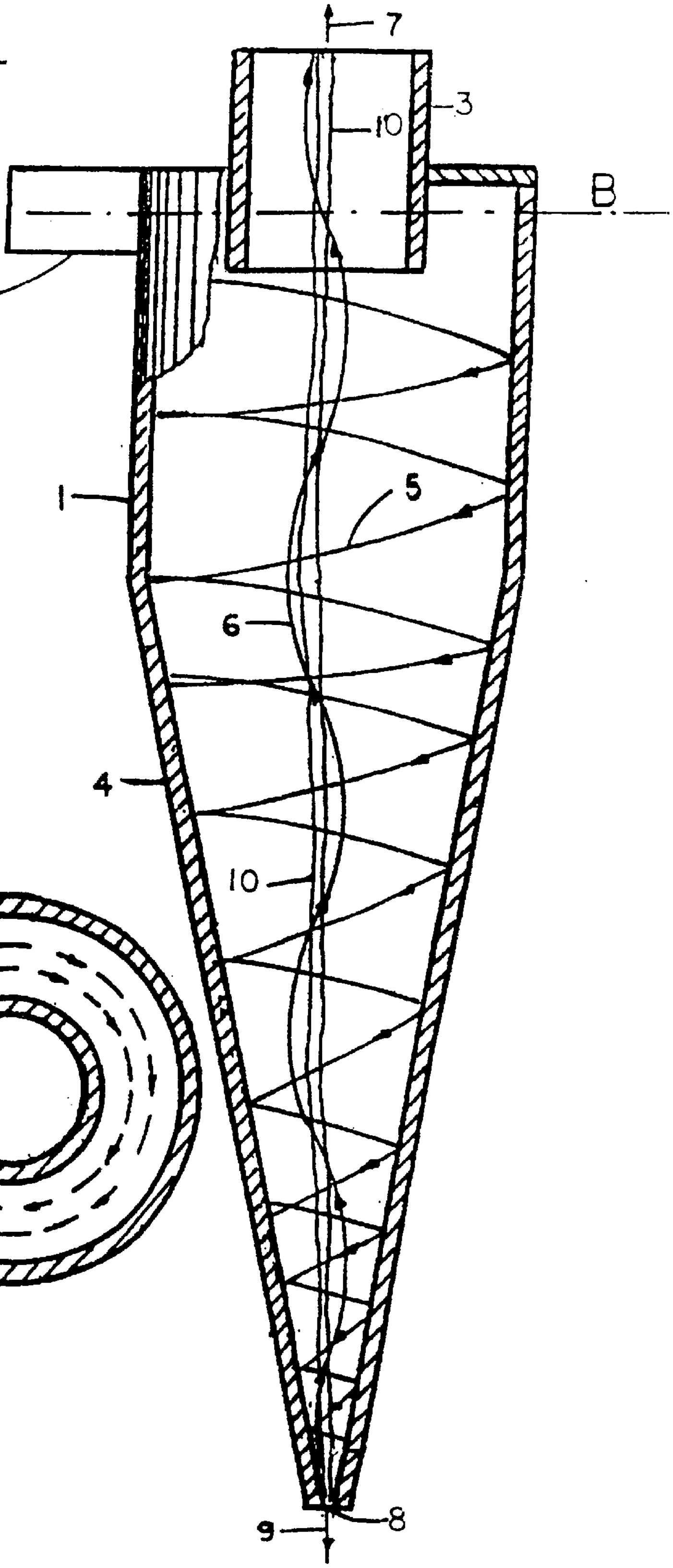
FIG. 1 PRIOR ART
FIG. 1 is a view of conventional cyclone having a cylindrical-conical separation chamber.
Figure 2:
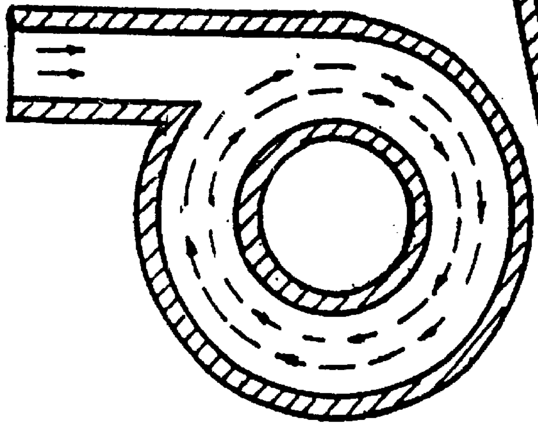
FIG. 2 PRIOR ART
FIG. 2 is a cross-sectional view of FIG. 1.

A conventional conical cyclone for separating of fluid mixtures which are centrifugally separable is illustrated in FIG. 1 and FIG. 2. This cyclone is comprised of short cylindrical portion 1 having an inlet duct 2 for introduction of a feed suspension or feed mixture in tangential direction. An exhaust or overflow pipe 3 extends through the top or ceiling wall of the cylindrical portion 1. A frustum-conical portion 4 is axially aligned with the exhaust pipe 3. In the portion 1 and 4 together as in separating chamber the feed suspension of feed mixture flows in the helical swirling flow pattern so to establish counter-flowing outer 5 and inner 6 vortexes within the separating chamber inherently causing solids in the fluid flow, which are smaller or lighter to move to the inner vortex 6 and exist through overflow pipe 3 as a smaller or lighter product stream or overflow 7. Ingredients in the fluid flow which are coarser or heavier move to the outer vortex 5 and exit through the outlet 8 as a coarser or heavier product stream or as underflow 9. Along the central hydrocyclone vertical axis to the air core 10 is created, that extends from underflow outlet 8 throughout all long conical portions 4 cylindrical portion 1, and finally through the exhaust pipe 3.

Figure 3:
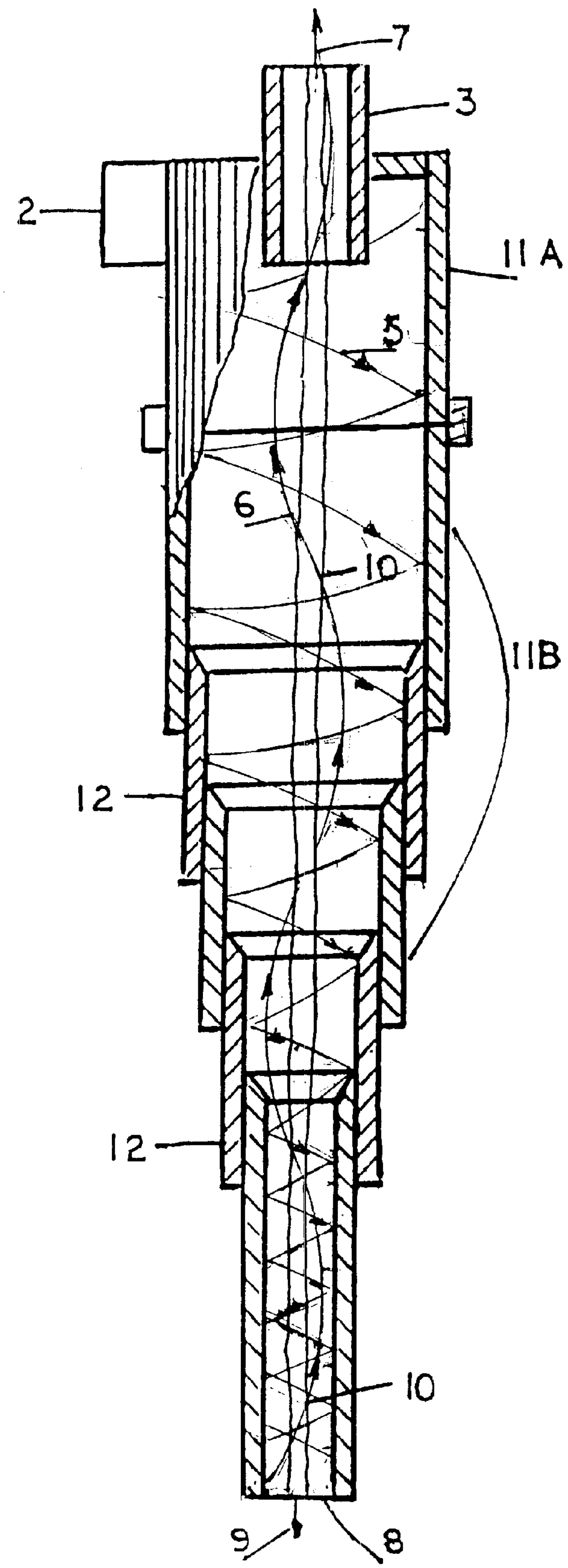
FIG. 3 is a view of the invented long free vortex telescopic separation chamber cyclone.

In FIG. 3 is shown invented cyclone comprising of cyclone head 11A, inlet duct 2, exhaust or overflow pipe 3 and with separation chamber 11B. Said axially elongated separation chamber **11*b*, being telescopic, comprises a plurality of cylindrical telescopic tubes 12. The combined overall length of said tubes 12** is adjustable according to a solid particles distribution of the separated feed fluid. The invented cyclone when operating with or without inner vortex bed, with or without air core, is having always the smaller pressure drop and higher both capacity and separation efficiency, compared to those of conventional conical cyclone.

Figure 4:
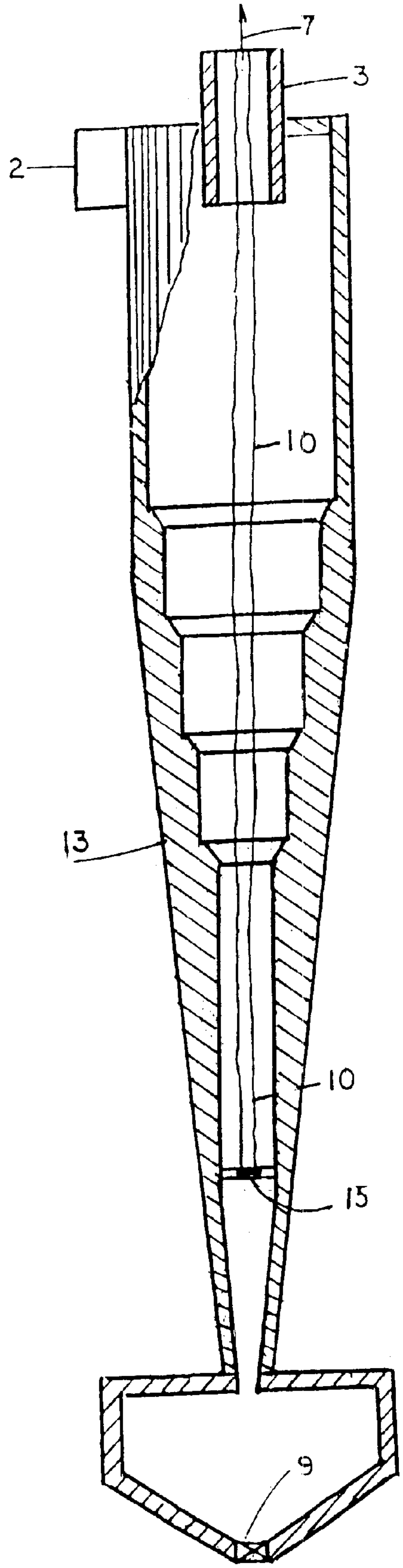
FIG. 4 is a view of second structural embodiment of the invented long free vortex telescopic separation chamber when it is molded along with whole cyclone housing from plastic, epoxy, metal or another material.

In FIG. 4 is shown a second embodiment of the invented cyclone, wherein the axially elongated cylindrical separation chamber, being telescopic, is structurally molded along with whole cyclone housing 13 from plastic, epoxy, metal or another material.

Figure 5:
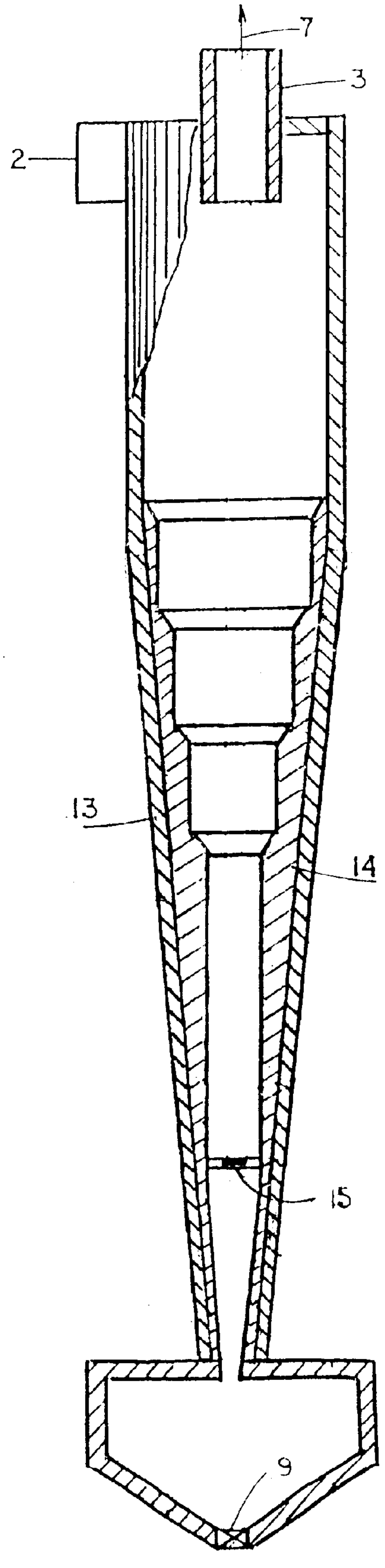
FIG. 5 is a view of third structural embodiment of the long free vortex telescopic separation chamber when it is the replaceable liners, molded from plastic, epoxy, metal, or another material and fitted in metal or another material cyclone housing.

In FIG. 5 is shown third embodiment of the invented cyclone, wherein the axially elongated cylindrical separation chamber, being telescopic is formed from replaceable liners 14 made of plastic, epoxy, metal or another material and fitted in the cyclone housing 13.

The invention is not to be limited by the embodiment shown in the drawings or description in the specification which is given by way of example and not limitation, but only in accordance with scope of the appended claims.

We claim:

1. A cyclone apparatus for separating a feed fluid comprising a solid-solid or solid-fluid particulate suspension, the cyclone apparatus comprising: an axially elongated cylindrical separation chamber, said axially elongated cylindrical separation chamber having an upper portion and a lower portion; an exhaust pipe having a bottom region disposed in said upper portion and an upper region disposed above the upper portion; a tangential inlet duct disposed in said upper portion; and a bottom outlet connected to the lower portion; wherein said feed fluid is introduced into the tangential inlet duct in a tangential direction in a helical swirling flowing pattern so as to establish a circular velocity and counter-flowing inner and outer vortexes within the axially elongated cylindrical separation chamber, a lighter portion of said feed fluid moves to the inner vortex and exits through said exhaust pipe as overflow and a heavier portion of said feed fluid moves to the outer vortex and exits through said bottom outlet as underflow, the improvement in the cyclone apparatus comprising:

said axially elongated cylindrical separation chamber being telescopic and comprising a plurality of cylindrical telescopic tubes having a combined overall length, the combined overall length being adjustable, wherein the combined overall length is adjusted according to a solids particle distribution of the separated feed fluid.

2. The improved apparatus according to claim 1 wherein said telescopic axially elongated cylindrical separation chamber along with the entire cyclone apparatus is structurally molded from one of the group consisting of epoxy, metal or another material.

3. The improved apparatus according to claim 1 wherein said telescopic axially elongated cylindrical separation chamber is formed from replaceable liners fitted into the cyclone apparatus, the replaceable liners being structurally molded from one of the group consisting of plastic, epoxy, metal or another material.

* * * * *